United States Patent [19]
Minami

[11] Patent Number: 6,141,326
[45] Date of Patent: Oct. 31, 2000

[54] EXCHANGE HAVING FUNCTION FOR DETECTING FAULT IN INTERNAL UNIT

[75] Inventor: Teiichi Minami, Kawasaki, Japan

[73] Assignee: Fujitsu Limited, Kawasaki, Japan

[21] Appl. No.: 09/039,778

[22] Filed: Mar. 16, 1998

[30] Foreign Application Priority Data

Oct. 20, 1997 [JP] Japan .................................. 9-287101

[51] Int. Cl.[7] .................................................. H04J 1/16
[52] U.S. Cl. .......................................... 370/244; 370/229
[58] Field of Search ..................................... 370/370, 216,
370/252, 251, 247, 248, 227, 228, 389,
395, 399, 400, 401, 465, 229, 244, 535,
537, 904, 905, 906, 916, 241, 242, 250,
351, 352, 466, 235, 522; 379/221; 340/825.5,
825.01, 827, 825.51, 825.52; 359/135, 139,
128, 110

[56] References Cited

U.S. PATENT DOCUMENTS 5,949,753   9/1999   Alexandes ................................. 370/216
5,991,312  11/1999   Koenig et al. ............................ 370/216

FOREIGN PATENT DOCUMENTS 62-131688   6/1987   Japan .
62-175060   7/1987   Japan .
 6104914    4/1994   Japan .
  758751    3/1995   Japan .
  969840    3/1997   Japan .

*Primary Examiner*—Dang Ton
*Attorney, Agent, or Firm*—Helfgott & Karas, P.C.

[57] ABSTRACT

An exchange has units traversed by cells, such as a line interface unit, a cell multiplexer/demultiplexer unit and a cell switch unit, as well as a processor. Each cell traversing unit detects and counts passing cell and cell error on a per-connection basis, adds the counts, along with unit identification data, onto an intra-office cell and then transmits the cell. One of the cell traversing units serving as an end unit accumulates, for each cell traversing unit and on a per-connection basis, the passing cell counts and the error cell counts sent from the other cell traversing units. The processor detects a fault in a cell traversing unit upon acquiring the passing cell count and cell error count, on a per-connection basis, of each cell traversing unit, the passing cell count and cell error count having been accumulated in the cell traversing unit serving as the end unit.

6 Claims, 18 Drawing Sheets

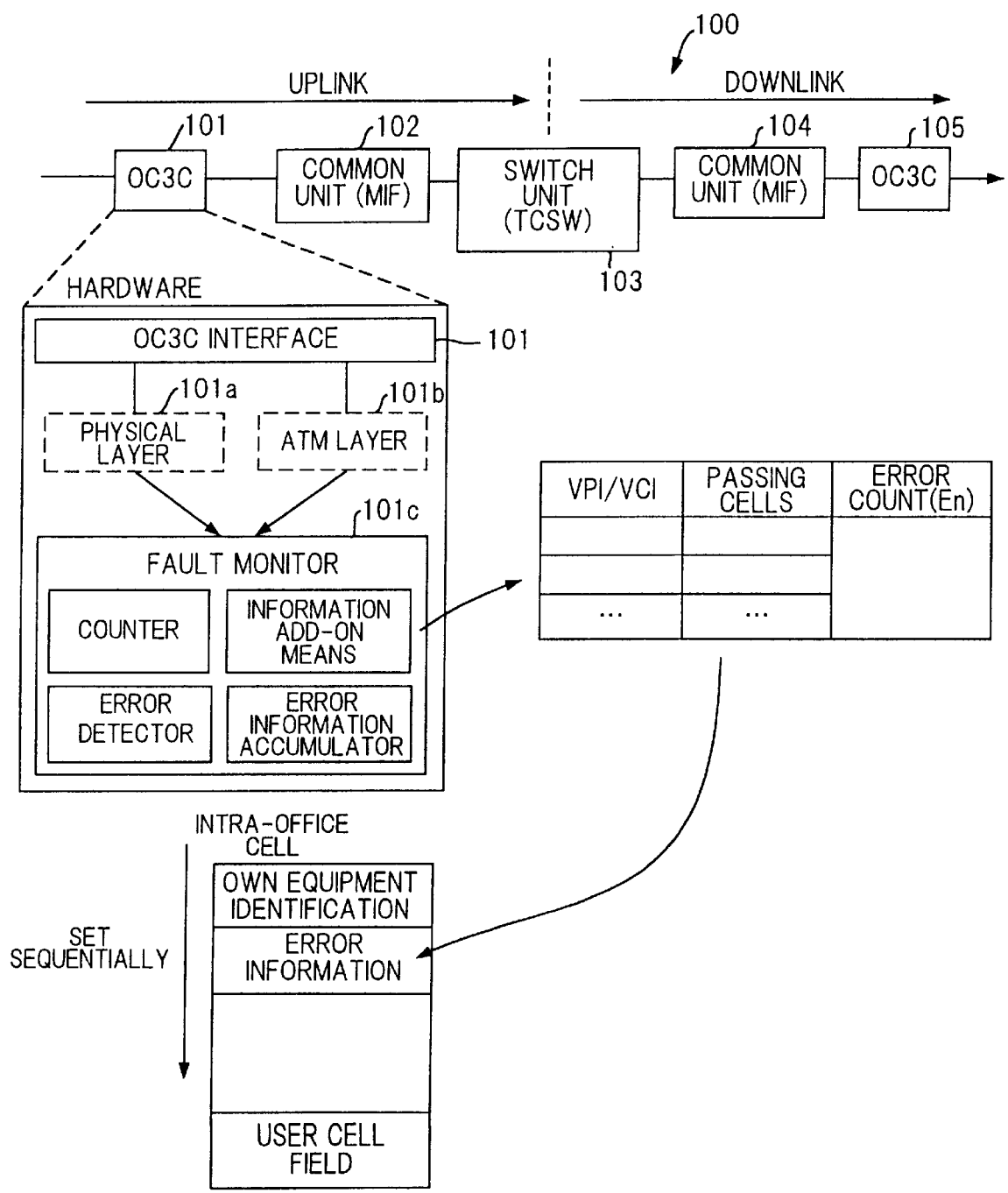

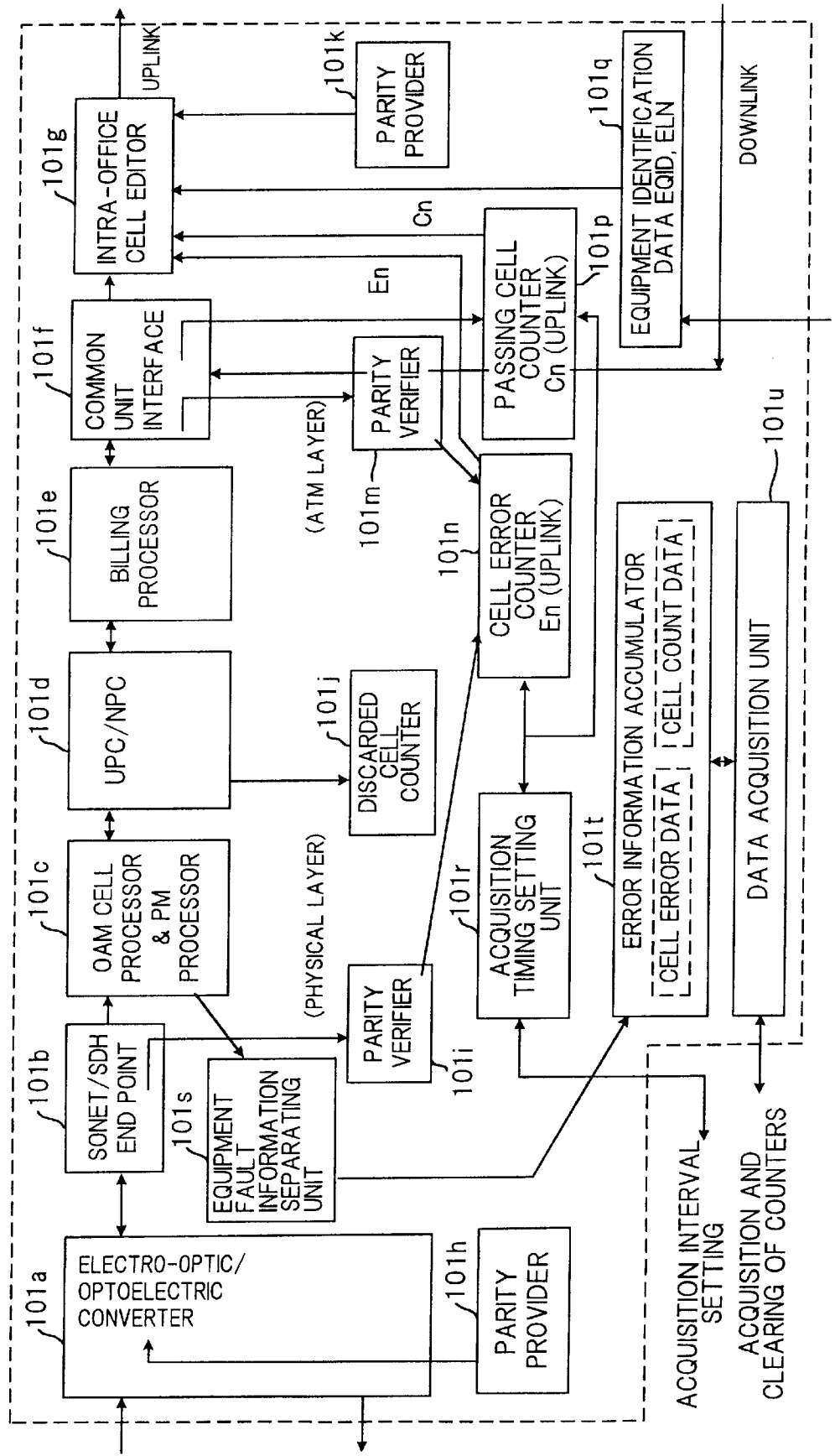

EXCHANGE HAVING FUNCTION FOR DETECTING FAULT IN INTERNAL UNIT

BACKGROUND OF THE INVENTION

This invention relates to an exchange and, more particularly, to an exchange having a function for detecting a fault in an intra-office unit and a function for executing prescribed control to deal with the fault.

There is increasing demand not only for audio communication and data communication but also for multimedia communication in which moving pictures are transmitted as well as audio and data. B-ISDN (broadband-ISDN) switching technology, which is based upon an asynchronous transfer mode (ATM), is being put to practical use as a means for realizing broadband communication for multimedia communication. In an ATM transmission system, all information is transferred at high speed upon being converted to fixed information referred to as cells. More specifically, in an ATM transmission system, logical links are multiplexed on a physical line to thereby allocate the line to a plurality of calls. Dynamic image data or audio data from a terminal corresponding to each call are broken down into fixed-length information units (referred to as "cells"), and the cells are transmitted over a line sequentially to realize multiplexing.

ATM network technology has been developed for the purpose of constructing the next generation of B-ISDNs (Broadband Integrated Services Digital Networks), and this technology is now being put into use. FIG. 15 is a block diagram illustrating the configuration of an ATM switching system. Shown in FIG. 15 are subscriber interfaces (or line IFs) $11_{11}$~$11_{1n}$, $11_{21}$~$11_{2n}$, $11_{31}$~$11_{3n}$, $11_{41}$~$11_{4n}$ connected to corresponding lines (transmission lines), multiplexer/demultiplexers $12_1$~$12_4$, an ATM switch unit 13, a system controller (processing unit) 14 and a maintenance terminal 15. The ATM switch unit 13 is connected to the plurality of multiplexer/demultiplexers $12_1$~$12_4$, switches input cells from certain multiplexer/demultiplexers and outputs the cells to prescribed multiplexer/demultiplexers. The multiplexer/demultiplexers $12_1$~$12_4$, which are connected to the pluralities of line interfaces $11_{11}$~$11_{1n}$, $11_{21}$~$11_{2n}$, $11_{31}$~$11_{3n}$, $11_{41}$~$11_{4n}$, respectively, multiplex uplink cells from a plurality of line interfaces IF and output the cells to the ATM switch unit 13. Furthermore, the multiplexer/demultiplexers $12_1$~$12_4$ demultiplex and output downlink cells, which arrive from the ATM switch unit 13, to the pertinent line interfaces.

The line interfaces $11_{11}$~$11_{4n}$, which are connected to the corresponding multiplexer/demultiplexers $12_1$~$12_4$, each extract an ATM cell (see FIG. 16A) mapped to the payload of a frame signal (e.g. a SONET frame) that has entered from the line and then subject the cell to predetermined processing (billing processing, UPC processing, OAM processing etc.) before outputting the cell to the multiplexer/demultiplexer. The multiplexer/demultiplexers $12_1$~$12_4$ multiplex the cells that enter from line interfaces, add routing information (tag information) TAG (FIG. 16B) onto the cells and then enter the cells into the ATM switch 13. The ATM switch unit switches a cell to a prescribed path by referring to this tag information TAG. The multiplexer/demultiplexers $12_1$~$12_4$ demultiplex the cells based upon the tag information and enter the cells into the prescribed line interfaces IF. The line interfaces $11_{11}$~$11_{4n}$ map the ATM cells, which enter from the multiplexer/demultiplexers $12_1$~$12_4$, to the payload of a SONET frame and send the ATM cells to the line side. The system controller 14 controls the line interfaces $11_{11}$~$11_{4n}$, multiplexer/demultiplexers $12_1$~$12_4$ and ATM switch unit 13.

FIG. 16A is a diagram showing the structure of an ATM cell, and FIG. 16B is a diagram illustrating the structure of an intra-office cell onto which tag information has been added. A cell is composed of a cell header HD and a 48-byte payload PLD. The header HD includes (1) a generic flow control (GFC) used in flow control between links, (2) a virtual channel identifier (VCI) for call identifying purposes, (3) a virtual path identifier (VPI) for specifying a path, (4) payload type (PT), (5) cell loss priority CLP and (6) header error control (HEC). In the case of the intra-office cell, the header HD further includes (7) tag information TAG. RES represents reserve.

FIG. 17 is a block diagram illustrating the construction of a line interface for a SONET. One line interface (an OC3C interface) 11 is provided in correspondence with one set of uplink/downlink optical lines. A multiplexer/demultiplexer (MUX/DMUX) and ATM switch are shown at 12 and 13, respectively, a physical layer interface at 21 and an ATM layer interface at 22.

The physical layer interface 21 includes an optoelectric converter 21a, an electro-optic converter 21b and a physical layer termination (SONET termination) 21c. The physical layer interface 21 (1) separates and outputs cells that have been mapped to the payload of a SONET frame signal and, in addition, maps a cell that has entered from the side of the ATM switch to the payload of a SONET frame signal and sends the cell to the corresponding line, (2) executes overhead processing and (3) executes SONET/SDH end-point processing.

The line interface 11 further includes an ATM layer termination 22a which executes (1) STM-ATM conversion, (2) cell length conversion, (3) cell synchronization processing and (4) cell loop-back processing, and a UPC/NPC processor 22b which performs monitoring to determine whether the reported value of transmission capacity and the actual cell inflow quantity conform. When cells in excess of the reported value flow in, processing for discarding cells in contravention of the stipulation is executed. The line interface 11 further includes a billing processor 22c, which counts the number of passing ATM cells and creates billing data. An OAM processor 22d implements a fault management function for identifying and notifying of faults, and a performance management function for managing error rate and cell loss rate of user information cells.

FIG. 18 is a diagram showing the construction of the multiplexer/demultiplexer 12. The multiplexer/demultiplexer includes VCC setting units $31_1$~$31_4$ provided for corresponding ones of the line interfaces $1b_1$~$1b_4$. Each VCC setting unit has a VC converter 31a for adding a routing tag onto the header of an input cell and replacing the input VCI contained in the header with an output VCI, and a VC conversion table 31b for storing the routing tags and the output VCIs. The multiplexer/demultiplexer further includes a multiplexer 33 for multiplexing cells, which enter from the plurality of line interfaces $11_1$~$11_n$, and entering the cells into the ATM switch SW, and a demultiplexer 34 for demultiplexing cells, which have been switched by the ATM switch 13, and entering the cells into prescribed line interfaces $11_1$~$11_4$ upon referring to the tag information TAG.

Thus, in ATM transmission, all information is sent and received in the form of cells of fixed length. This makes possible high-speed data communication and high-quality image communication by hardware. However, if cell loss or cell error (bit error) occur owing to hardware failure in the ATM exchange, the high-speed communication of data and high-quality communication of images becomes impossible.

Consequently, in a case where cell loss or cell error has taken place in an ATM exchange, it is necessary to detect the same, specify the location at which the cell loss or cell error occurred and effect recovery promptly.

With a large-capacity ATM exchange, however, the apparatus is highly complex owing to ATM switches and multiplexer/demultiplexers arranged in multiple stages. Accordingly, a problem which arises is that it is difficult to determine in which intra-office unit cell loss and cell error (bit error) have occurred.

Further, in order to conclude that a unit is a faulty unit, the conventional practice is for a serviceman to run a test on the equipment. However, specifying a suspect piece of equipment while verifying the number of cells that pass through each unit is time consuming. Furthermore, a detailed inspection for cell error cannot be performed unless special measuring equipment is used.

Further, equipment is replaced or a changeover is made to standby equipment depending upon the circumstances under which a fault occurs. However, since specifying the fault takes time, as mentioned above, the replacement or changeover cannot be performed promptly. This has a major effect upon the ATM subscribers.

SUMMARY OF THE INVENTION

Accordingly, an object of the present invention is to make possible the automatic and prompt detection of fault occurrence (occurrence of cell loss and bit error), the faulty unit and the direction in which the fault occurred.

Another object of the present invention is to arrange it so that a threshold value of cell loss regarded as being indicative of fault occurrence can be decided based upon quality of service class and so that the threshold value can be changed by a command.

A further object of the present invention is to automatically execute prescribed control (message output control, control for changeover to a standby route, control for diagnosing faulty equipment and control for reassigning intra-office connections) to deal with a fault when occurrence of the fault is detected.

In accordance with the present invention, the foregoing objects are obtained by providing an exchange comprising (1) cell traversing units each having a counter for counting passing cells on a per-connection basis, an error detector for detecting and counting cell bit errors, and information add-on means for adding the passing cell count or error count onto an intra-office cell and then transmitting the same, (2) a cell traversing end unit (e.g., a line interface unit), which is one of the cell traversing units and serves as an end unit, having an error information accumulator for accumulating, for each cell traversing unit and on a per-connection basis, the passing cell count or error count sent from the cell passing units, and (3) a processor for detecting a fault in a cell traversing unit based upon the passing cell count or error count, on the per-connection basis, of each cell traversing unit, the passing cell count or error count having accumulated in the cell traversing end unit.

In this case if each of the cell traversing units is provided, in each of uplink and downlink directions, with a passing cell counter for detecting number of passing cells, an error detector and information add-on means, then the processor will be able to identify the direction in which a fault has occurred.

The processor monitors any difference in passing cell count over each identical connection between each cell traversing unit and its neighboring cell traversing unit and, if a difference is found, judges that cell loss has occurred in a cell traversing unit downstream in terms of cell flow.

Further, on the basis of quality of service class requested at connection set-up, the processor sets, on a per-connection basis, a threshold value on a cell loss count construed to be indicative of equipment fault, and judges that equipment failure has occurred if the threshold value has been exceeded.

Furthermore, depending upon detection of occurrence of equipment failure, the processor performs at least one control operation from among message output control for outputting a equipment fault message, control for changing over to standby equipment, control for diagnosing the faulty equipment and control for selecting an alternative intra-office route. In this case the threshold value, as well as the control operation executed by the processor at occurrence of equipment failure, can be changed by a command from a control panel.

Other features and advantages of the present invention will be apparent from the following description taken in conjunction with the accompanying drawings.

BRIEF DESCRIPTION OF THE DRAWINGS

FIG. 1 is a diagram useful in describing operation of a cell traversing unit;

FIG. 3 is a block diagram illustrating the construction of an OC3C interface unit (discrete unit);

DESCRIPTION OF THE PREFERRED EMBODIMENT (a) Operation of Cell Traversing Unit in Exchange FIG. 1 is a diagram for describing the operation of units traversed by cells in an exchange, particularly the operation of the OC3C interface serving as a line interface unit. Shown at 100 is an ATM exchange having OC3C interface units 101, 105 serving as optical line interfaces (discrete units), multiplexer/demultiplexers 102, 104 serving as common units, and a switch unit 103.

Figure 17:
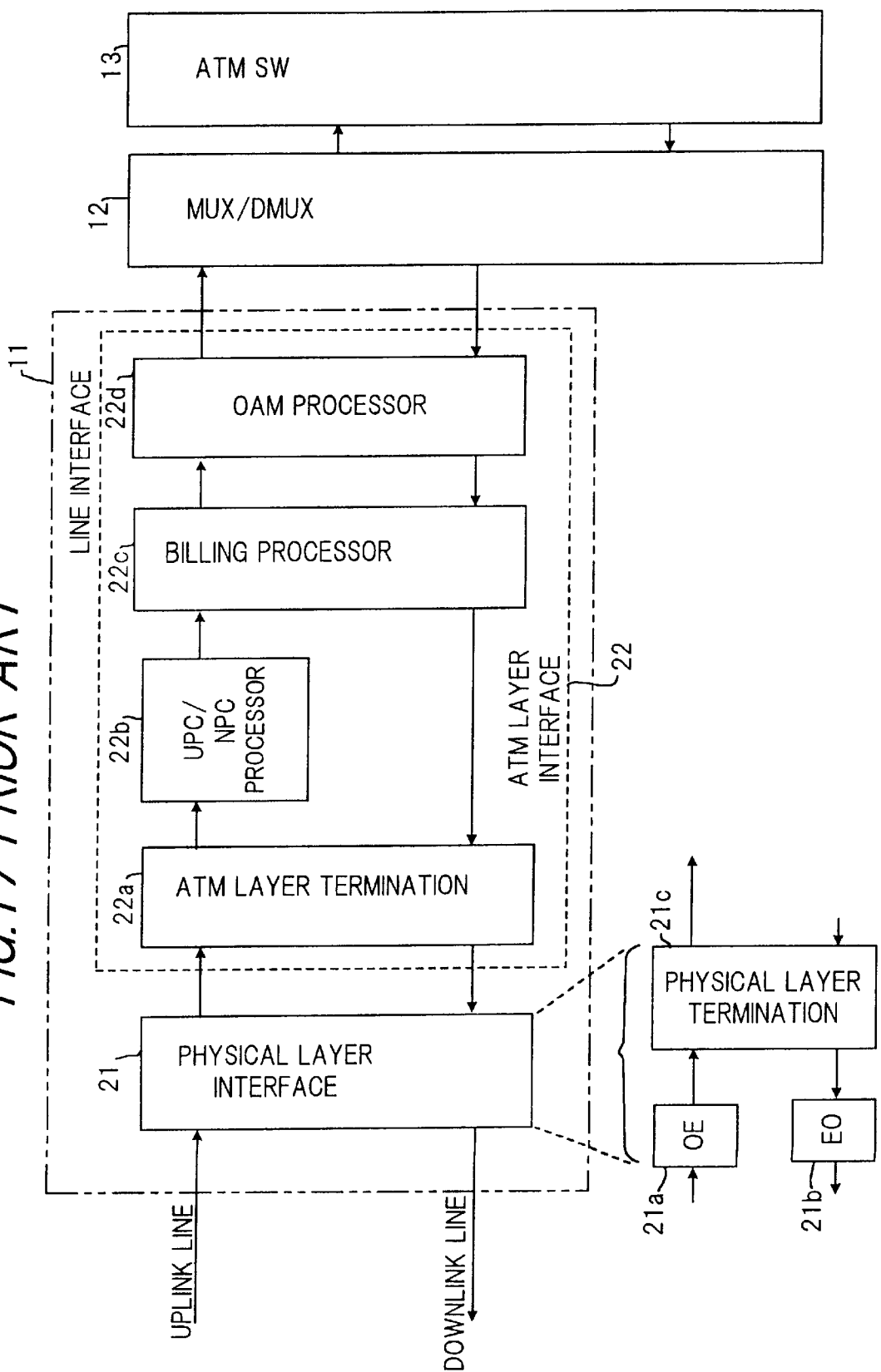
FIG. 17 is a block diagram showing the construction of a line interface.
Figure 18:
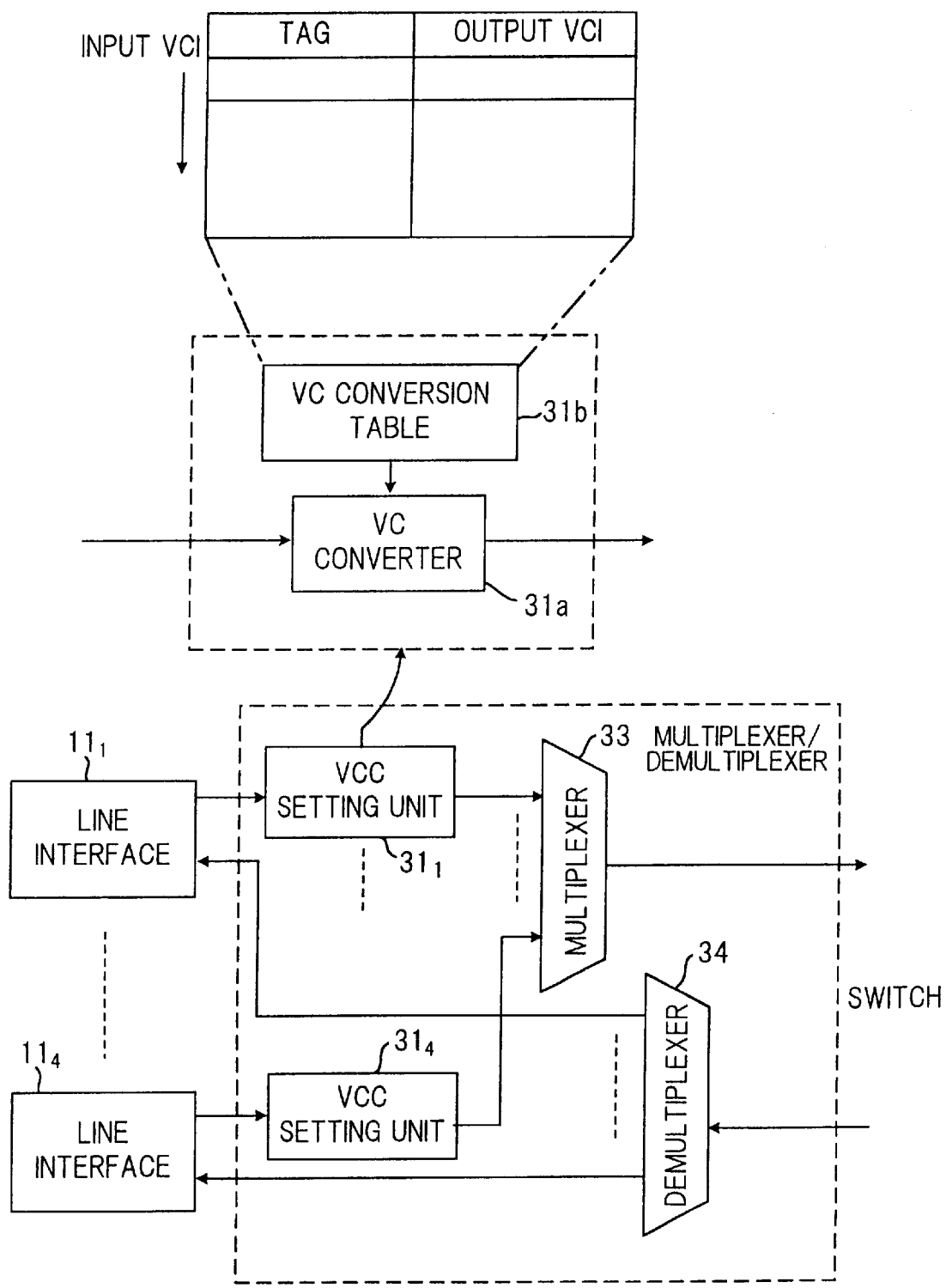
FIG. 18 is a diagram showing the construction of a multiplexer/demultiplexer.

Each of the OC3C interface units 101, 105 has, in addition to a physical layer 101a and an ATM layer 101b which execute the primary processing of the line interface (see FIG. 17), a fault monitoring section 101c. The fault monitoring section 101c has (1) a counter for counting passing cells on a per-connection (VPI/VCI) basis, (2) an error detector for detecting and counting cell bit errors, (3) information add-on means for adding the passing cell count Cn or an error count En onto an intra-office cell and then transmitting the same, and (4) an error information accumulator for accumulating, for each unit and on a per-connection basis, the passing cell counts or error counts sent from other units.

The multiplexer/demultiplexers 102, 104 and the switch unit 103 also execute the original processing and in addition have, like the OC3C interface, the passing cell counter, cell error detector and information add-on means mentioned in (1) through (3) above. They do not, however, having the error information accumulator (4).

(b) Intra-office Cell

Figure 2A:
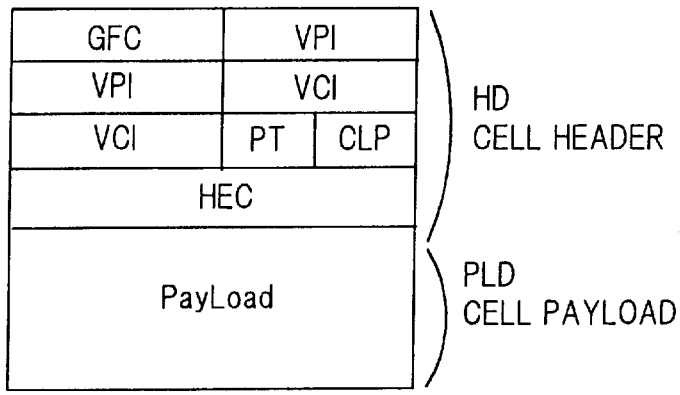
FIGS. 2A and 2B are diagrams useful in describing intra-office cells according to the present invention.
Figure 2B:
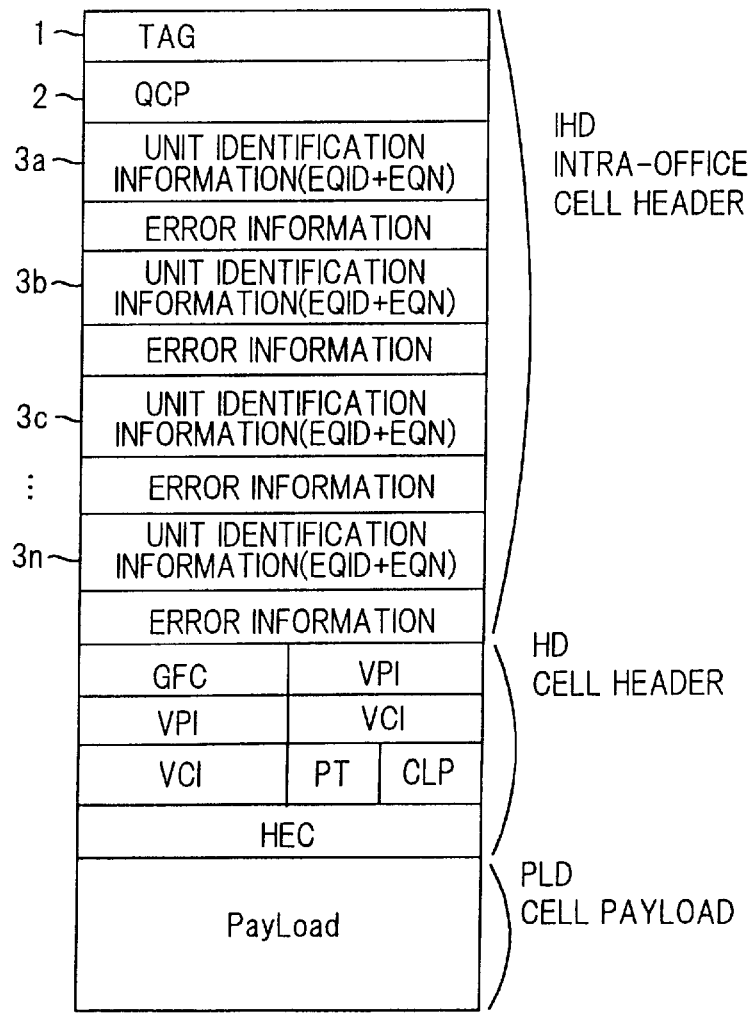

FIG. 2A is a diagram showing the structure of an ordinary ATM cell extracted from the payload of an OC3C frame signal (156 Mbps), and FIG. 2B is a diagram showing the structure of an intra-office cell. An intra-office cell is obtained by adding an intra-office cell header IHD onto the usual ATM cell (cell header HD+payload PLD). The intra-office cell has routing information (tag information) TAG 1, quality control path (QCP) 2 indicative of communication quality, and equipment fault information 3a~3n which the units 101~105 add onto the intra-office cell. The equipment fault information includes (1) unit identification information and (2) error information.

The unit identification information specifies the unit by combining an EQID (Equipment Identifier) and an ELN (Equipment Logical Number). The error information includes connection identification information (VPI/VCI), data transfer direction (uplink or downlink), passing cell count and error count (cell error or bit error).

Each unit sets the equipment fault information successively from the top of the intra-office cell. If there is a field that has already been set, then the unit sets the equipment fault information in the next field. The initialization of this field is carried out when the intra-office is generated from a user cell.

(c) OC3C Interface Unit (Discrete Unit)

FIG. 3 is a block diagram illustrating the construction of the OC3C interface unit (discrete unit) 101. The interface unit includes an electro-optic/optoelectric converter 101a for converting light to electricity and electricity to light, and a physical layer termination (SONET/SDH end point) 101b for (1) separating and outputting cells that have been mapped to the payload of a SONET frame signal and, in addition, mapping a cell that has entered from the side of the ATM switch to the payload of a SONET frame signal and sending the cell to the corresponding line, (2) executing overhead processing and (3) executing SONET/SDH end-point processing. An OAM cell processor & PM processor 103c has a fault management function for identifying and giving notification of faults, and a performance management (PM) function for managing error rate and cell loss rate, etc., of user information cells. The interface unit further includes a UPC/NPC processor 101d, a billing processor 101e, an interface 101f for interfacing a common unit (multiplexer/demultiplexer), and an intra-office cell editor 101g for editing and transmitting intra-office cells.

A first parity providing unit 101h furnishes the data of the SDH/SONET format with parity, a first parity verifier 101i subjects the data of the SDH/SONET format to a parity check, a counter 101j counts cells discarded by the UPC/NPC processor 101d, a second parity providing unit 101k provides ATM cell data with parity to make possible the checking of cell error and bit error in the succeeding unit, and a second parity verifier 101m for performing a parity check of ATM cell data using parity that was provided by the preceding unit. In the case of an ATM cell, (1) parity error of a header is referred to as "cell error" and (2) parity error of a payload is referred to as "bit error", though these errors are handled in the same manner.

A cell error counter 101n counts up an error count En whenever notification of error detection is given by the first and second parity verifiers 101i, 101m. A passing cell counter 101p counts cells, which are sent from the interface 101f, on a per-connection (VPI/VCI) basis to thereby monitor the number of passing cells. An equipment identification register 101q stores equipment identification data (EQID, ELN) that has been set. An acquisition timing setting unit 101r instructs the cell error counter 101n and passing cell counter 101p to send the error count En and passing cell count Cn to the intra-office cell editor 101g at predetermined acquisition intervals. The intra-office cell editor 101g adds the error count En and the passing cell count Cn per connection, of which it has been notified at the acquisition intervals, along with the equipment identification data (EQID, ELN), onto an intra-office cell and then sends the cell to the unit of the succeeding stage.

An equipment fault information separating unit 101s separates and outputs equipment fault information (equipment identification information, error count En, passing cell count Cn for every connection) sent from each unit upon being added onto intra-office cells. An error information accumulator 101t accumulates equipment fault information sent from each unit. A data acquisition unit 101u (1) totals and stores the error counts on a per-unit basis, (2) totals and stores the passing cell counts for every connection and for every unit, and (3) sends the totaled equipment fault information based upon an information acquisition request from a processor (not shown).

(d) Multiplexer/demultiplexer (Common Unit)

Figure 4:
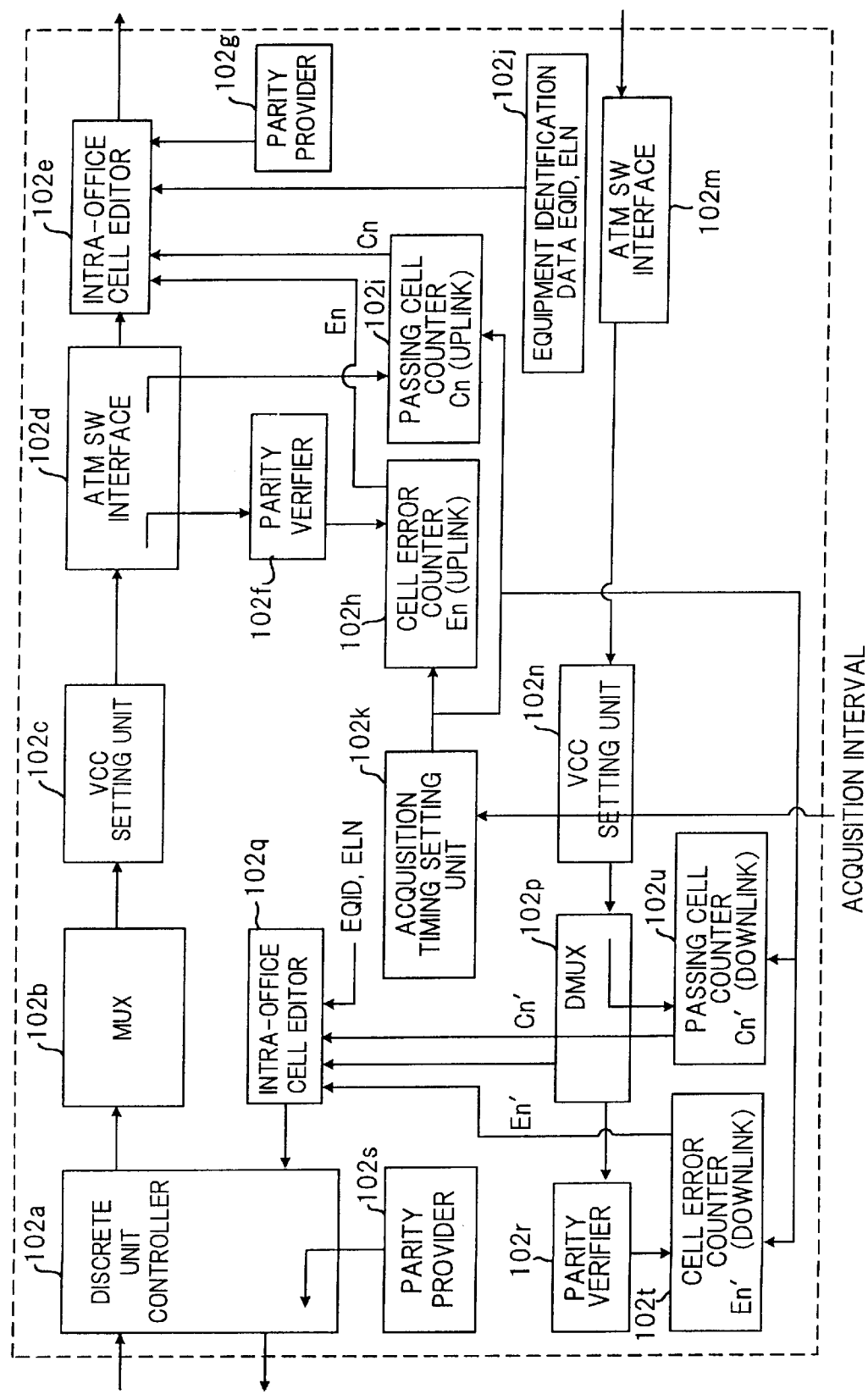
FIG. 4 is a block diagram illustrating the construction of a multiplexer/demultiplexer (common unit)

FIG. 4 is a block diagram of the multiplexer/demultiplexer (common unit) 102. The multiplexer/demultiplexer includes an interface (discrete unit controller) 102a for interfacing the discrete unit, a multiplexer (MUX) 102b, an uplink-direction VCC setting unit 102c for adding a routing tag onto the header of an input cell and replacing the input VCI contained in the header with an output VCI, an ATM switch interface 102d for the uplink direction, and an intra-office cell editor 102e for adding equipment fault information onto intra-office cells and then transmitting the cells.

A first parity providing unit 102f performs a parity check of ATM cell data in the uplink direction using parity that has been provided by the preceding discrete unit, a first parity providing unit 102g furnishes the ATM cell data with parity to make possible the checking of cell error and bit error in the succeeding unit (the switch unit), a cell error counter 102h counts errors in the uplink direction whenever notification of error detection is given by the first parity verifier 102f, and an uplink-direction passing cell counter 102i counts cells, which are sent from the interface 102d, on a per-connection (VPI/VCI) basis to thereby monitor the numbers of passing cells. An equipment identification register 102j stores equipment identification data (EQID, ELN) that has been set. An acquisition timing setting unit 102k instructs the cell error counter 102h and passing cell counter 102i to send the uplink-direction error count En and passing cell count Cn to the intra-office cell editor 102e at predetermined acquisition intervals. The acquisition timing setting unit 102k operates in the same manner with regard to downlink-direction error count En' and passing cell count Cn'. The intra-office cell editor 102e adds the error count En and the passing cell count Cn per connection, along with the equipment identification data (EQID, ELN), onto an intra-office cell and then sends the cell to the unit of the succeeding stage at the acquisition intervals.

The multiplexer/demultiplexer further includes an ATM switch interface 102m for the downlink direction, a VCC setting unit 102n for the downlink direction, a demultiplexer 102p for demultiplexing cells and inputting them to prescribed OC3C interfaces (line interfaces) upon referring to the tag information TAG, a downlink-direction intra-office cell editor 102q for adding equipment fault information onto intra-office cells and then transmitting the cells, a second parity verifier 102r for performing a parity check of ATM cell data in the downlink direction using parity that has been provided by the ATM switch of the preceding stage, a second parity providing unit 102s for furnishing the ATM cell data with parity to make possible the checking of cell error and bit error in the succeeding unit (the OC3C interface unit), a cell error counter 102t for counting errors in the downlink direction whenever notification of error detection is given by the second parity verifier 102r, and a downlink-direction passing cell counter 102u for counting cells, which are sent from the demultiplexer 102p, on a per-connection (VPI/VCI) basis to thereby monitor the numbers of passing cells. The intra-office cell editor 102q adds the error count En' and the passing cell count Cn' per connection, along with the equipment identification data (EQID, ELN), onto an intra-office cell and then sends the cell to the unit of the succeeding stage at the acquisition intervals.

(e) Control by Processor

Figure 5:
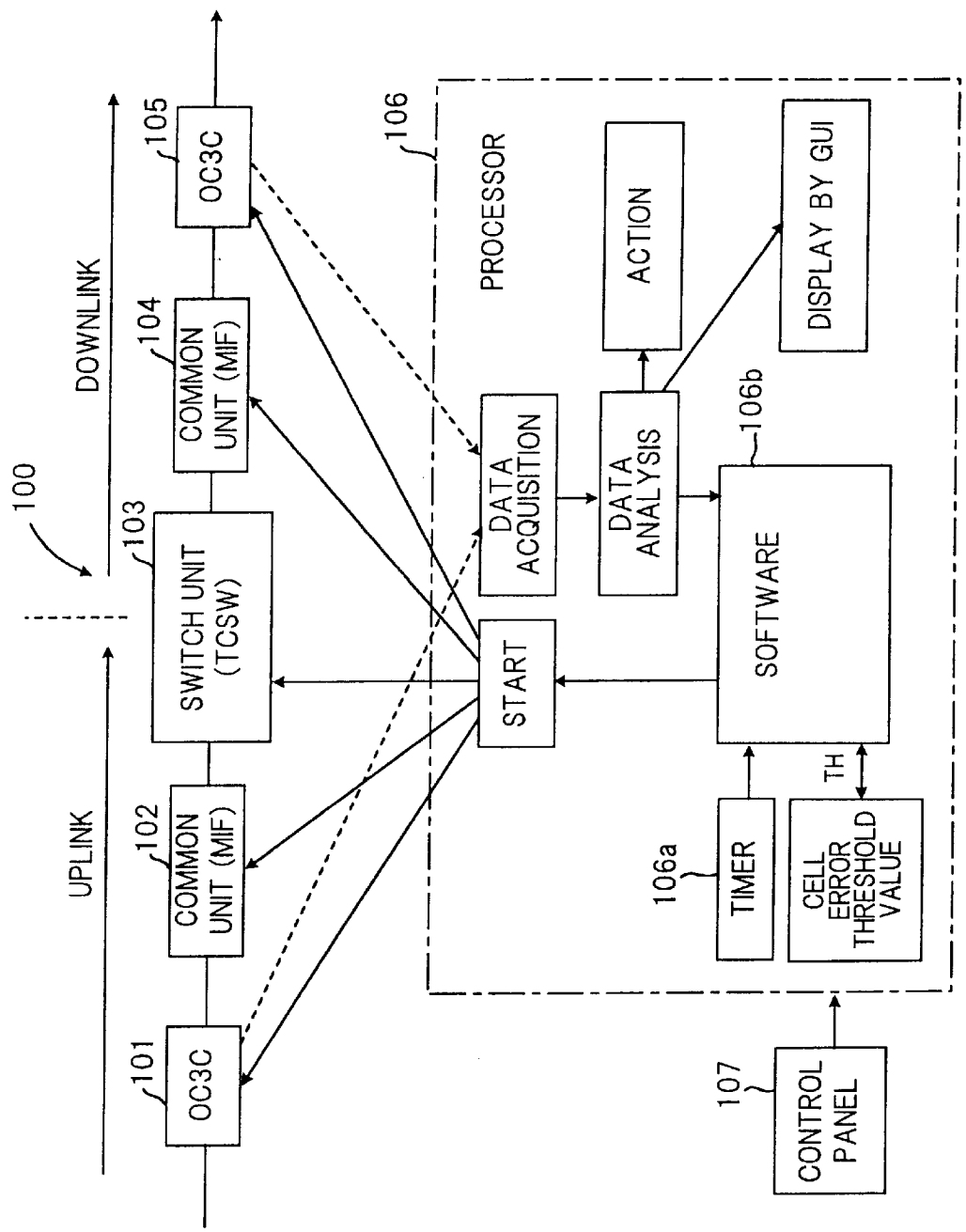
FIG. 5 is a diagram useful in describing control executed by a processor.

FIG. 5 is a diagram useful in describing control executed by a processor in the exchange. Shown at 100 is the ATM exchange having the OC3C interface units 101, 105, the multiplexer/demultiplexers 102, 104 serving as common units, the switch unit 103, a processor 106 and a control panel 107. The processor 106 is capable of communication with the units 101~105 by means of a bus. The processor 106, which is constituted by a computer, has hardware items such as a CPU, ROM, RAM and I/O interfaces and operates in accordance with software. The software functions are illustrated as blocks in FIG. 5. When an interrupt is applied by a timer 106a at first time intervals t, which are comparatively short, the software 106b starts up the units 101~105 and instructs them to send error information. As a result, each unit adds equipment fault information classified by uplink/downlink direction onto intra-office cells and then transmits the cells. The OC3C interface unit 105 as an end unit in the exchange extracts the equipment fault information that has been added on by each unit and (1) totalizes the passing cell counts on a per-connection basis and per-unit basis and (2) totalizes the error counts on a per-unit basis. If desired, it can be arranged so that the totalizing operations are performed by the processor.

The above-described processing is executed to totalize the passing cell counts and error counts at the first time intervals t. When a comparatively long second time interval T (>t) is in effect, the software 106b collects the passing cell count and error count for each unit totalized by the line interface 105 and analyzes the collected data. The data analysis includes checking for any difference in passing cell count over each connection between one cell traversing unit and its neighboring cell traversing unit and, if a difference is found, judging that cell loss has occurred in a unit downstream in terms of cell flow. In a case where the cell loss rate is greater than a threshold value TH, it is judged that a fault has occurred. If a fault is judged to have occurred, the occurrence of the fault, the faulty unit, whether the particular signal is an uplink or downlink signal and the connection identifier (VPI/VCI), etc., are displayed on a monitor via a graphical user interface. In addition, a prescribed action (message output control, control for switching to redundant equipment, control for diagnosing the faulty equipment, control for selecting an alternative intra-office route, etc.) is executed. It should be noted that the threshold value TH serving as the criterion for judging errors is set automatically by determining the QOS (Quality of Service) from information indicated by the originating terminal at connection set-up.

Figure 6:
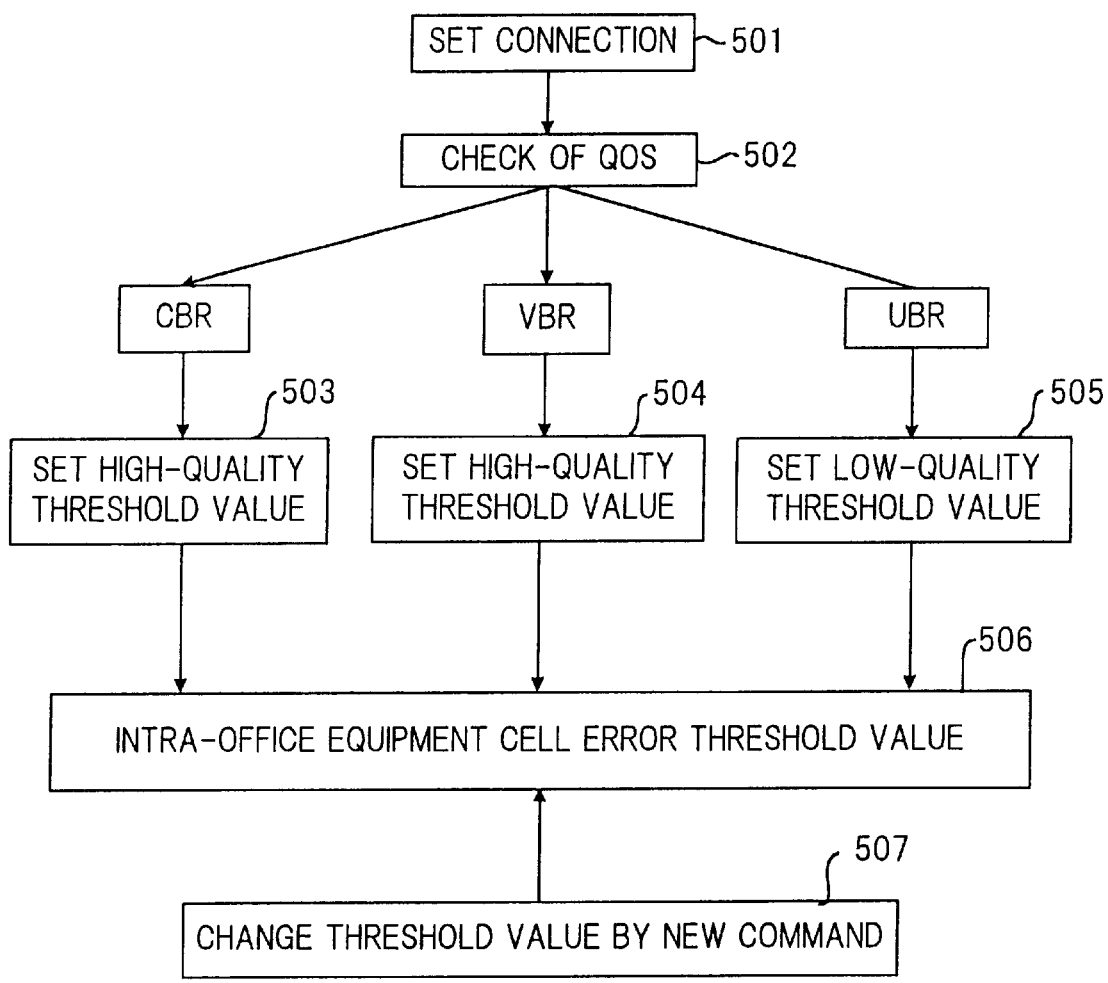
FIG. 6 is a flowchart of processing for setting a threshold value.

FIG. 6 is a flowchart of processing executed by the processor to set a threshold value in regard to cell loss.

The processor determines the QOS of a call by referring to information indicated by the originating terminal when a connection is set up, and checks to see whether the bit rate is a CBR (Constant Bit Rate), VBR (Variable Bit Rate) or UBR (Unspecified Bit Rate) (steps 501, 502). The processor sets a threshold value for high quality in case of CBR or VBR and sets a threshold value for low quality in case of UBR (steps 502~505). Specific numerical values of high- and low-quality thresholds are set in advance.

The processor decides that a fault has occurred when the cell error count exceeds the threshold value TH (step 506). The threshold value TH is set or updated by a command from the control panel 107 as needed (step 507).

In the foregoing a threshold value is set for cell loss on a per-connection basis. However, a threshold value cannot be set for cell error on a per-connection basis. The reason for this is that when a cell error occurs, the particular VPI/VCI of the cell in which the error occurred is unknown. In regard to cell error, therefore, threshold values are set separately for all passing cells of a unit.

Figure 7:
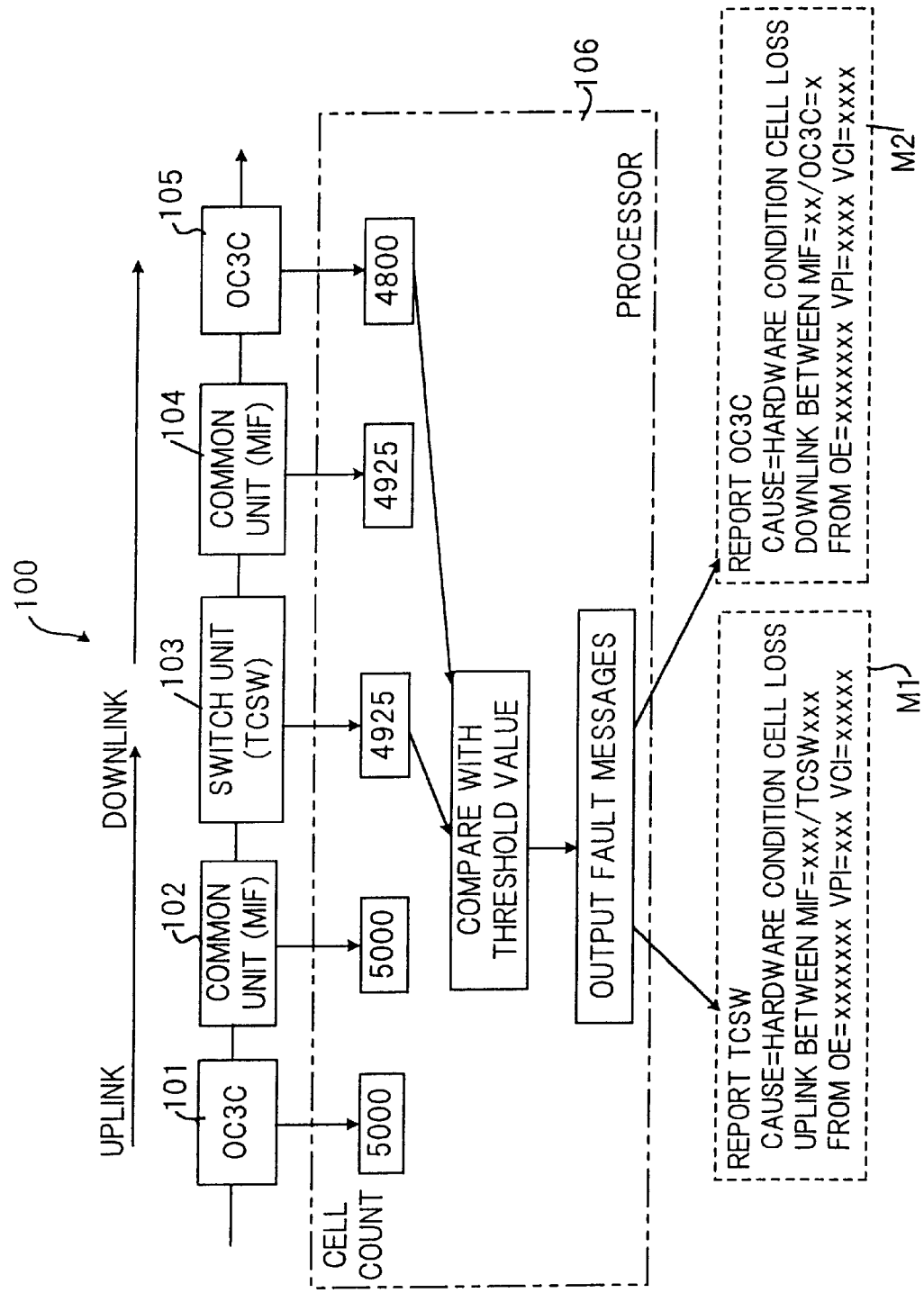
FIG. 7 is a diagram useful in describing cell-loss detection control.

FIG. 7 is a diagram useful in describing control for detecting cell loss.

The processor 106 acquires the passing cell count, on a per-connection basis, of each of the units 101~105 from the OC3C interface unit 105 at the prescribed time intervals T, and analyzes the acquired data. That is, the processor 106 checks for any difference in passing cell count over each connection between one unit and its neighboring unit. Assume that the passing cell counts of a certain connection (for which the threshold value TH is $10^{-9}$) in the units 101~105 are 5000, 5000, 4925, 4925, 4800, respectively. This indicates that cell loss has occurred between the common unit (MIF) 102 and the switch unit (TCSW) 103 and that the cell loss rate is $75/5000=0.125 \times 10^{-2}$. This indicates further that cell loss has occurred between the common unit (MIF) 104 and the OC3C interface unit 105 and that the cell loss rate is $125/4925=0.254 \times 10^{-2}$.

Next, the processor 106 compares these cell loss rates with the threshold value $10^{-9}$. Since each of these cell loss rates is greater than the threshold value $10^{-9}$, the processor 106 judges that a fault has occurred and outputs fault messages M1, M2. Each of the fault messages M1, M2 includes (1) the unit that reported the low cell passing count, (2) the cause (CAUSE) of the fault, (3) whether the direction is the uplink or downlink (UPLINK/DOWNLINK) direction, (4) the section in which the fault occurred, and (5) the connection (VPI/VCI), etc.

Figure 8:
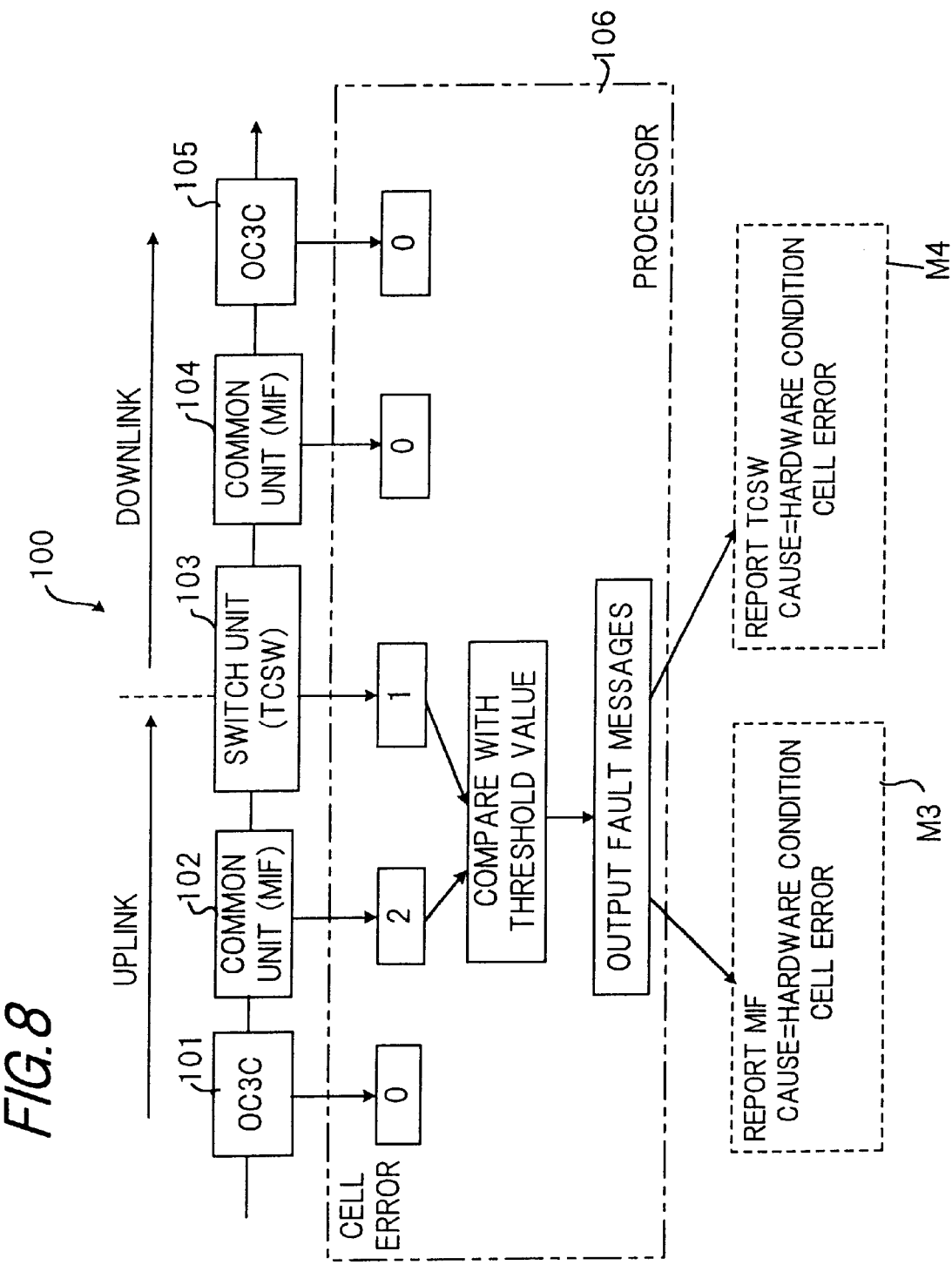
FIG. 8 is a diagram useful in describing cell-error detection control.

FIG. 8 is a diagram useful in describing control for detecting cell error.

The processor 106 acquires the passing cell count and cell error, on a per-connection basis, of each of the units 101~105 from the OC3C interface unit 105 at the prescribed time intervals T, and analyzes the acquired data. That is, the processor 106 checks the cell error count in each unit. Assume that the error counts in the units 101~105 are 0, 2, 1, 0, 0, respectively. This indicates that an error has occurred between the common unit (MIF) 102 and the switch unit (TCSW) 103.

Next, the processor 106 obtains the total counts of the cells that have traversed the common unit (MIF) 102 and switch unit (TCSW) 103 and computes the respective error occurrence rates $\epsilon_1$, $\epsilon_2$. When the error occurrence rates have been found, the processor 106 compares a separately set value (e.g., $10^{-10}$), which serves as a criterion for judging that an error has occurred, with the error occurrence rates $\epsilon_1$, $\epsilon_2$ and, when an error occurrence rate is greater than the threshold value, judges that a fault has occurred and outputs error messages M3, M4. Each of the fault messages M3, M4 includes (1) the unit that reported the error and (2) the cause (CAUSE) of the fault.

(f) Control (Actions) by Processor in Response to Fault Detection

Figure 9:
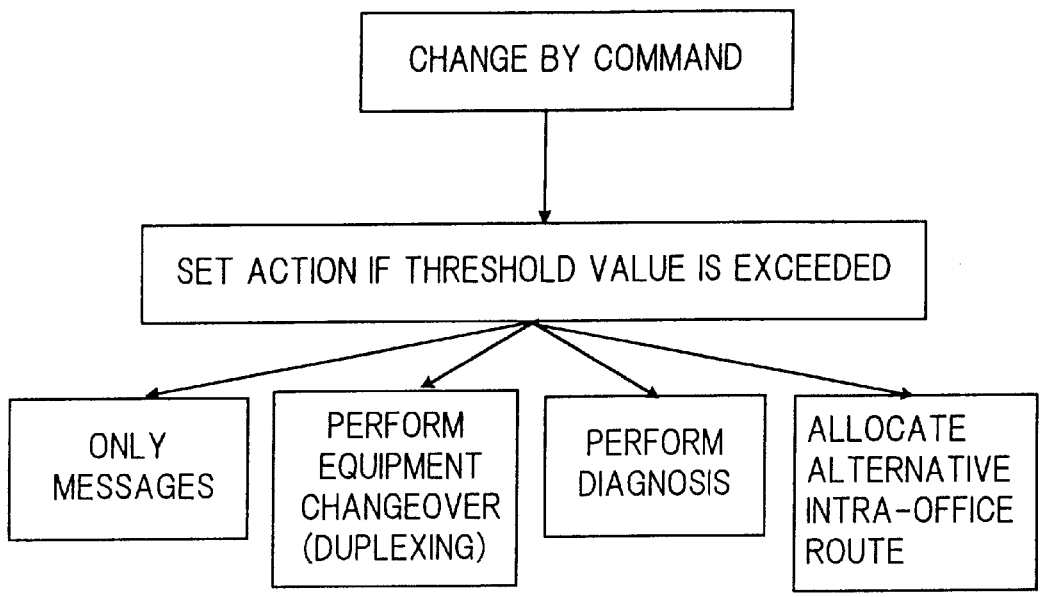
FIG. 9 is a diagram useful in describing the setting of an action to be executed.

When the cell loss count or cell error count is greater than the threshold value and equipment is detected to be faulty as a result, the processor of the exchange performs at least one control operation from among (1) message output control, (2) control for changing over to standby equipment, (3) control for diagnosing the faulty equipment and (4) control for selecting an alternative intra-office route. The particular control operation carried out is set beforehand by a command entered at the control panel 107, as shown in FIG. 9.

(f-1) Message Output Control

Message output control is control for creating the messages M1~M4, as described above with reference to FIGS. 7 and 8, and outputting the message to a monitor or the like.

(f-2) Control for Changing Over to Standby Equipment

Figure 10:
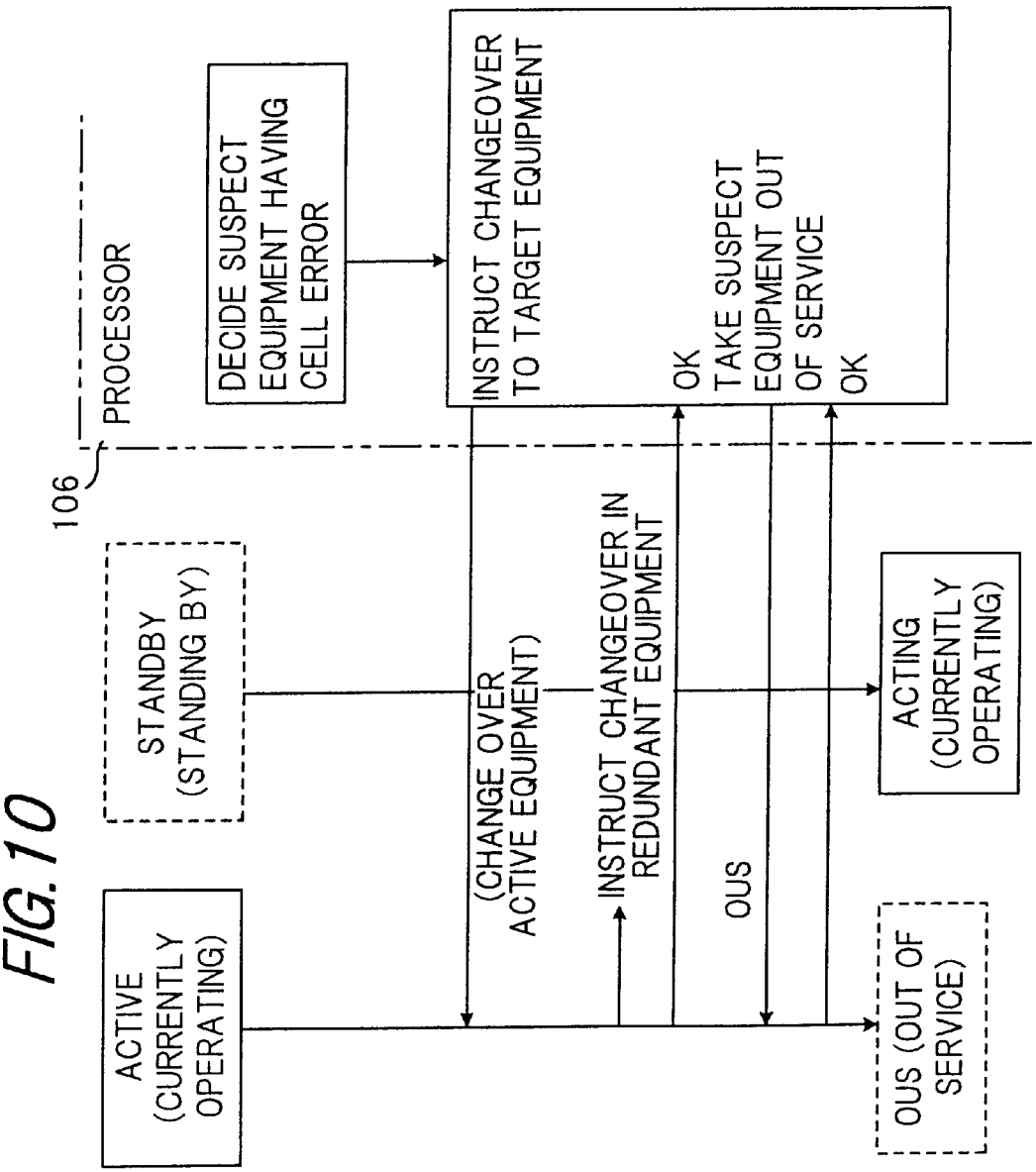
FIG. 10 is a diagram useful in describing equipment changeover control.

FIG. 10 is a diagram useful in describing changeover control for making a standby unit the active unit in a case where a fault has occurred in the active unit in a redundant arrangement.

When the processor 106 concludes that a piece of equipment is suspected of being faulty, the processor instructs an active unit ACT to change over. In response, the active unit instructs a standby unit SBY to perform an active/standby changeover and to notify the processor 106 that the changeover is "OK". In response to the "OK" notification, the processor 106 places the active unit, operating until now, in the OUS (Out of Service) state. The processor 106 then places the standby unit, standing by until now, in the operating state to thereby continue service.

(f-3) Control for Diagnosing Faulty Equipment

Figure 11:
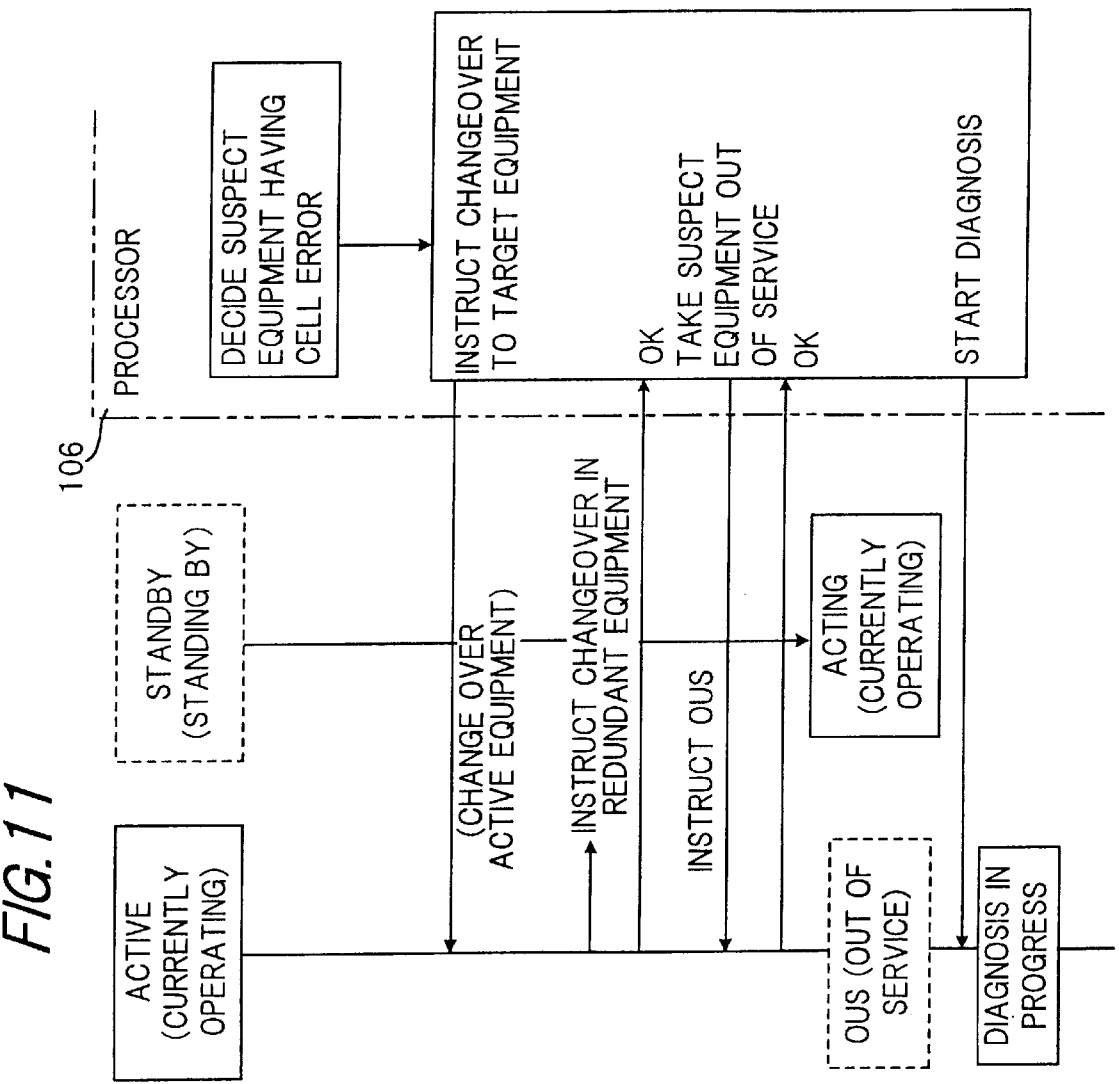
FIG. 11 is a diagram useful in describing equipment changeover control and diagnostic control.

FIG. 11 is a diagram useful in describing diagnostic control for making the standby unit the active unit and then diagnosing the faulty unit in a case where a fault has occurred in the active unit in a redundant arrangement.

When the processor 106 concludes that a piece of equipment is suspected of being faulty, the processor instructs the active unit ACT to change over. In response, the active unit instructs the standby unit SBY to perform an active/standby changeover and to notify the processor 106 that the changeover is "OK". In response to the "OK" notification, the processor 106 places the active unit, operating until now, in the OUS state. The processor 106 then places the standby unit, standing by until now, in the operating state to thereby continue service. After the changeover from the active unit to the standby unit is made, the processor 106 subjects the former active unit (the suspect equipment) to diagnosis and testing.

Figure 12:
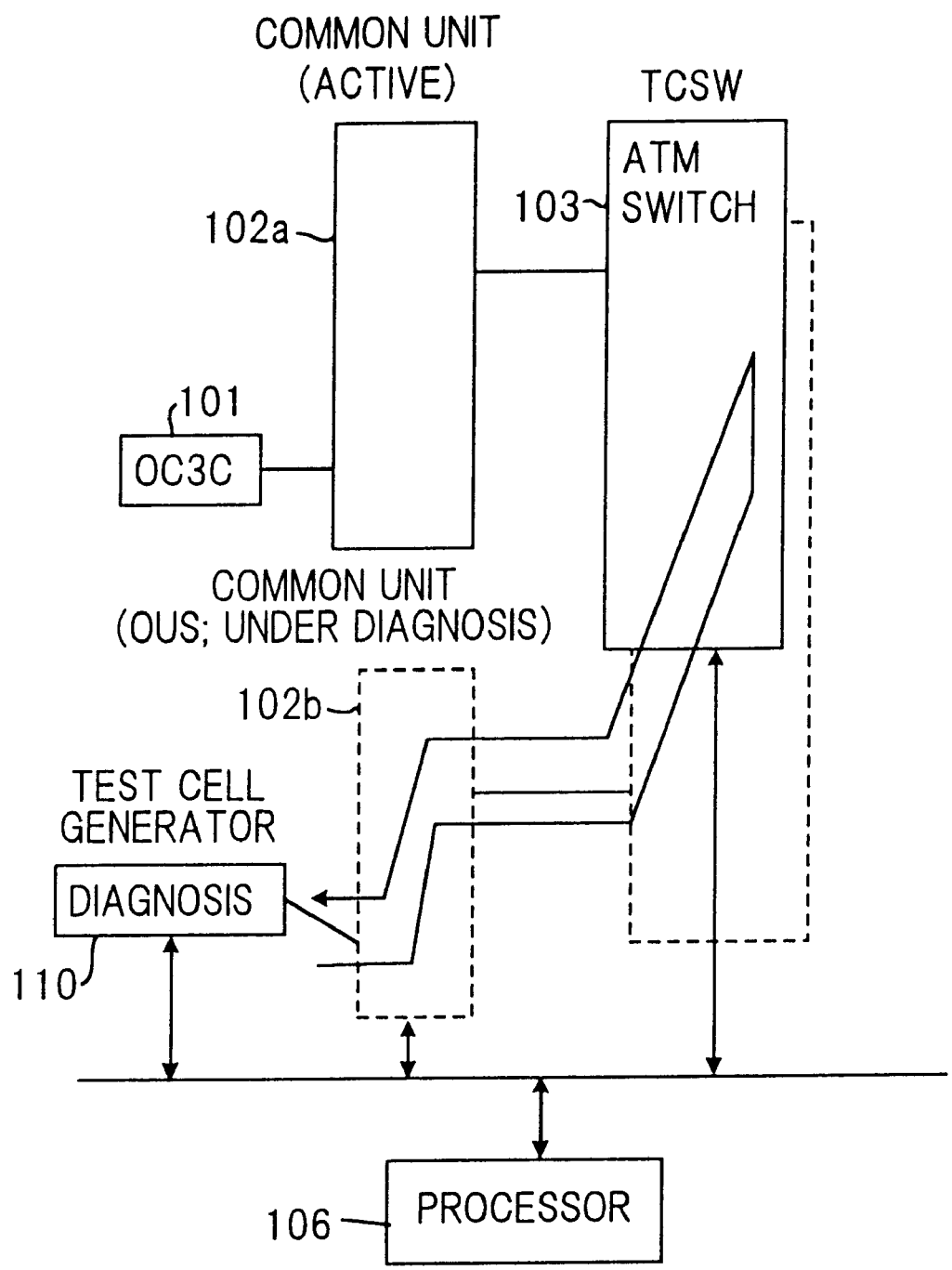
FIG. 12 is a diagram useful in describing diagnostic control.

FIG. 12 is a diagram useful in describing diagnostic control. Here it is assumed that occurrence of a fault has been detected in the redundant multiplexer/demultiplexer (common unit) 102. Shown in FIG. 12 are the OC3C interface unit 101, an active common unit 102*a* after an active/standby changeover is made in response to occurrence of a fault, a standby common unit 102*b*, which is suspected of being faulty equipment, the ATM switch unit 103, the processor 106 and a diagnostic apparatus 110.

If the processor 106 concludes that a fault has developed in the common unit 102*b* owing, say, to occurrence of cell loss in excess of the threshold value, the processor starts diagnostic control following the active/standby changeover. More specifically, the processor 106 notifies the diagnostic apparatus 110 of the connection (VPI/VCI) in which the fault was detected and instructs the diagnostic apparatus 110 to subject this connection to a cell continuity test. Further, the processor 106 instructs the VCC setting unit of the common unit 102*b* to establish a path in such a manner that cells having the aforesaid connection will be looped back by the switch. The diagnostic apparatus 110 transmits a fixed number ($=N$) of cells having the VPI/VCI of which it has been notified and counts the number of cells looped back. If the number of cells returning is different from the number of cells transmitted, the diagnostic apparatus 110 judges that the standby common unit 102*b* is truly faulty and then carries out a more detailed recovery operation.

(f-4) Control for Selecting Alternative Intra-office Route

Figure 13:
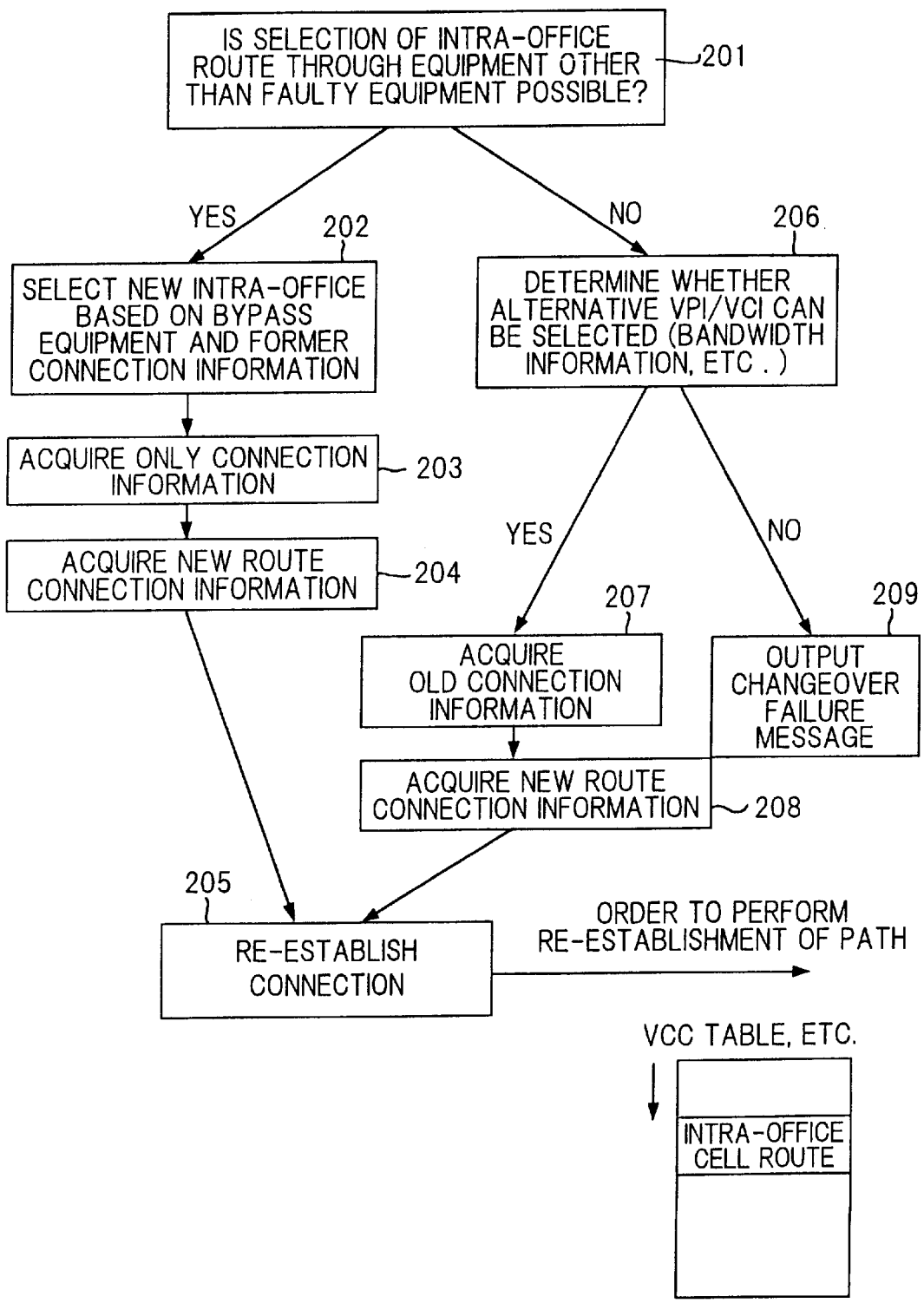
FIG. 13 is a diagram useful in describing control for selecting an alternative intra-office route.

FIG. 13 is a diagram useful in describing control for selecting an alternative intra-office route.

When the processor 106 concludes that a piece of equipment is suspected of being faulty, the processor checks to determine whether it is possible to select an intra-office route through an item of equipment other than the one that is faulty (step 201). If selection is possible, the processor 106 selects a new route based upon the bypassing item of equipment and the former connection information (step 202). Next, the old connection information is acquired (step 203), the new route connection information is acquired (step 204) and a connection is re-established on the basis of these items of information. That is, the processor 106 sends a path re-establish order to the VCC setting units of the new and old connections, deletes the path information concerning the old connection and sets path information conforming to the new connection (step 205).

Figure 14:
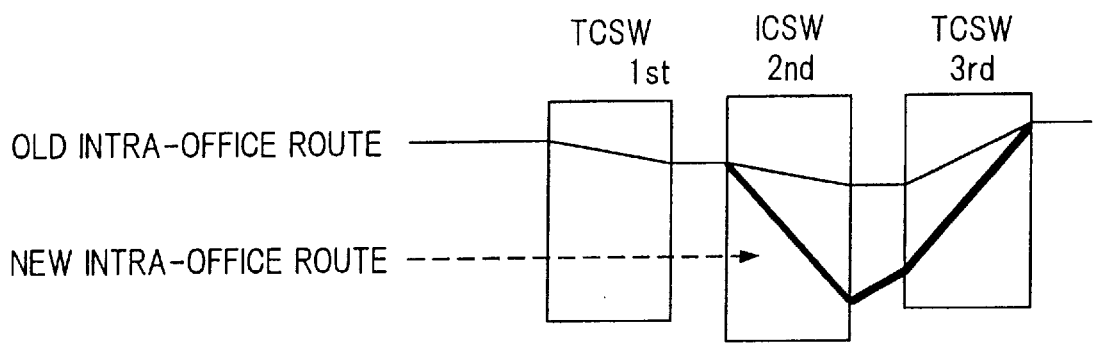
FIG. 14 is a diagram useful in describing the changing of an intra-office route.
Figure 15:
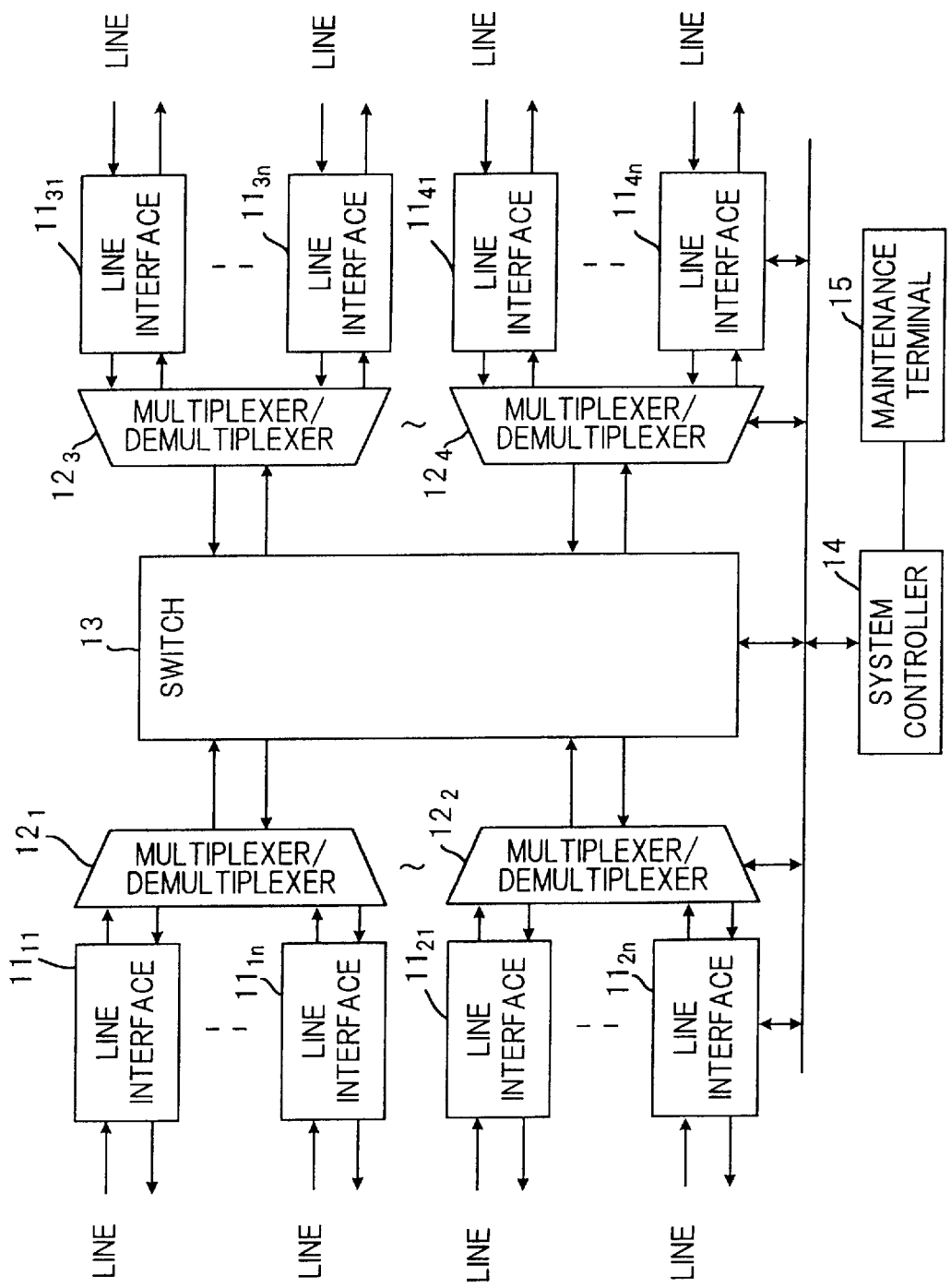
FIG. 15 is a diagram showing the configuration of an ATM system.
Figure 16B:
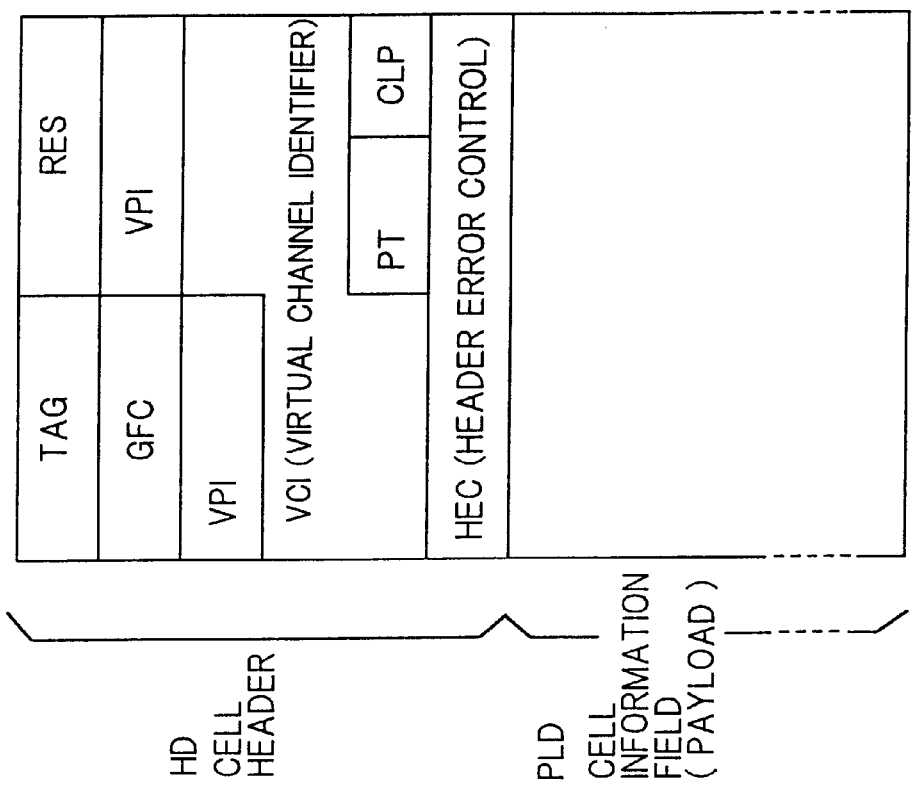
FIGS. 16A and 16B are diagrams useful in describing cell formats.
Figure 16A:
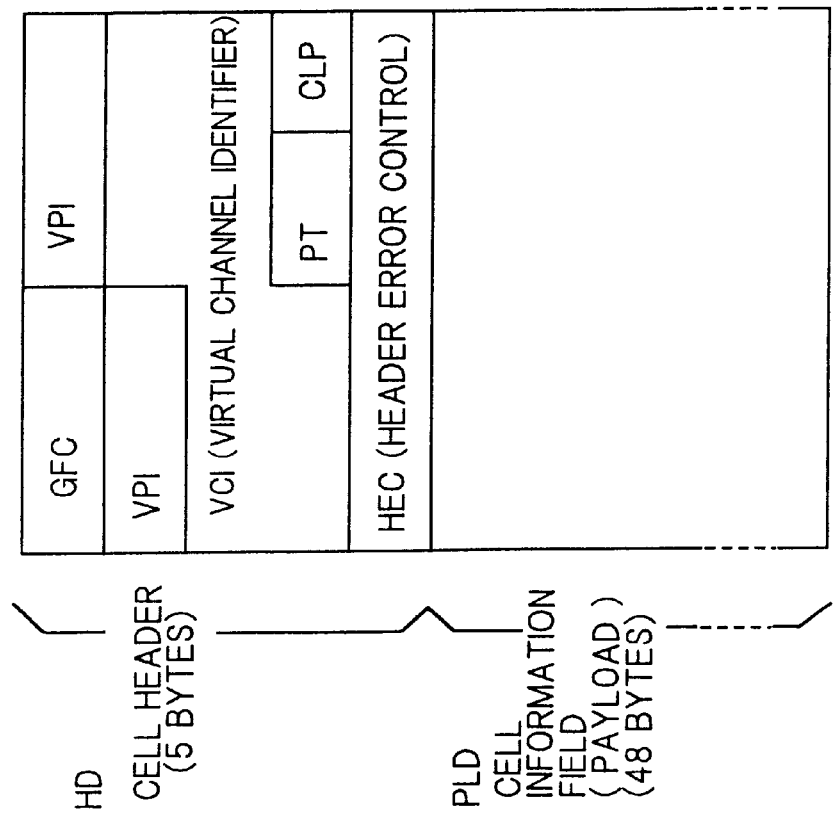

If it is found at step 201 that it is not possible to select an intra-office route through an item of equipment other than one that is faulty, then the processor 106 checks to determine whether another intra-office VPI/VCI can be selected (step 206). If the selection can be made, then the processor 106 collects the old connection information and the new route connection information (steps 207, 208) and re-establishes the connection on the basis of these items of information (step 205). FIG. 14 illustrates the alteration of a VPI/VCI to effect a changeover from an old intra-office route (indicated by the fine line) to a new intra-office route (indicated by the bold line) in a case where a fault has occurred in an intermediate switch (ICSW) of a multiple-stage ATM switch. It is necessary to rewrite the tag information of the second and third switches in such a manner that cells having the new VPI/VCI will be switched along the bold line by making this change in the intra-office route.

If it is found at step 206 that another intra-office VPI/VCI cannot be selected, then the processor 106 outputs a message indicative of changeover failure (step 209).

Though it is described above that the line interface (OC3C interface unit), which is the intra-office terminal unit, is the unit that accumulates and totalizes the passing cell counts and error counts of other units, an arrangement may be adopted in which a different unit performs accumulation and totalization.

Thus, in accordance with the present invention, fault occurrence (occurrence of cell loss and bit error), the faulty unit and the direction in which the fault occurred can be detected promptly and automatically.

In accordance with the present invention, a threshold value of cell loss regarded as being indicative of fault occurrence can be decided based upon quality of service class, and the threshold value can be modified by a command.

In accordance with the present invention, prescribed control (message output control, control for changeover to a standby route, control for diagnosing faulty equipment and control for reassigning an intra-office connection) can be executed automatically to deal with a fault when occurrence of the fault is detected.

As many apparently widely different embodiments of the present invention can be made without departing from the spirit and scope thereof, it is to be understood that the invention is not limited to the specific embodiments thereof except as defined in the appended claims.

What is claimed is:

1. An exchange for extracting a cell that has been mapped to a payload of a line signal, converting the cell to an intra-office cell that includes routing information, and sending the intra-office cell to a prescribed line by switching the intra-office cell on the basis of the routing information, comprising:

a plurality of cell traversing units through which cells pass; and a processor for controlling each of said cell traversing units; wherein each of said cell traversing units has a counter for counting passing cells on a per-connection basis and a information add-on means for adding the passing cell count as well as unit identification data onto an intra-office cell and then transmitting the intra-office cell;

a cell traversing unit of said cell traversing units that serves as an end unit has a error information accumulating means for accumulating, for each cell traversing unit and on a per-connection basis, the passing cell counts sent from other cell traversing units; and said processor detects a fault in a cell traversing unit based upon the passing cell count, on the per-connection basis, of each cell traversing unit, the passing cell count having been accumulated in said cell traversing unit serving as the end unit.

2. The exchange according to claim 1, wherein each of the cell traversing units has an error detecting means for detecting and counting bit errors in passing cells, adding the error count onto an intra-office cell and then transmitting the intra-office cell;

said cell traversing unit serving as the end unit accumulates, for each cell traversing unit, the error counts sent from other cell traversing units; and said processor detects a fault in a cell traversing unit based upon the error count of each cell traversing unit, the error count having been accumulated in said cell traversing unit serving as the end unit.

3. The exchange according to claim 2, wherein each of the cell traversing units has, in each of uplink and downlink directions, a passing cell counter, an error detector and a information add-on means for adding passing cell count as well as unit identification data onto an intra-office cell and transmitting the intra-office cell.

4. The exchange according to claim 1, wherein said processor monitors any difference in passing cell count over each identical connection between each cell traversing unit and its neighboring cell traversing unit and, if a difference is detected, judges that cell loss has occurred in a cell traversing unit downstream in terms of cell flow.

5. The exchange according to claim 1, wherein said processor sets, on a per-connection basis, a threshold value on a cell loss count construed to be indicative of equipment fault, said threshold value being set based upon a quality of service class requested at establishment of a connection.

6. The exchange according to claim 2, wherein said processor responds to detection of occurrence of an equipment fault by performing at least one control operation from among message output control for outputting a equipment fault message, control for changing over to standby equipment, control for diagnosing the faulty equipment and control for selecting an alternative intra-office route.

* * * * *